(12) United States Patent
Combs et al.

(10) Patent No.: US 8,832,419 B2
(45) Date of Patent: Sep. 9, 2014

(54) ENHANCED MICROCODE ADDRESS STACK POINTER MANIPULATION

(75) Inventors: Jonathan D. Combs, Austin, TX (US); Kameswar Subramaniam, Austin, TX (US)

(73) Assignee: Intel Corporation, Santa Clara, CA (US)

(*) Notice: Subject to any disclaimer, the term of this patent is extended or adjusted under 35 U.S.C. 154(b) by 892 days.

(21) Appl. No.: 12/978,471

(22) Filed: Dec. 24, 2010

(65) Prior Publication Data

US 2012/0166766 A1 Jun. 28, 2012

(51) Int. Cl.
*G06F 9/28* (2006.01)
*G06F 9/30* (2006.01)

(52) U.S. Cl.
CPC ... *G06F 9/28* (2013.01); *G06F 9/30* (2013.01)
USPC .......................................................... 712/243

(58) Field of Classification Search
CPC .................................... G06F 9/30; G06F 9/28
See application file for complete search history.

(56) References Cited

U.S. PATENT DOCUMENTS

| | | | | |
|---|---|---|---|---|
| 5,719,880 | A * | 2/1998 | Leung ........................... | 714/733 |
| 5,845,102 | A * | 12/1998 | Miller et al. ................... | 712/211 |
| 5,890,181 | A * | 3/1999 | Selesky et al. ................ | 715/255 |
| 6,141,740 | A * | 10/2000 | Mahalingaiah et al. ...... | 711/215 |
| 6,789,186 | B1 * | 9/2004 | Brockmann et al. .......... | 712/231 |
| 7,231,511 | B2 * | 6/2007 | Cornaby et al. .............. | 712/239 |
| 7,975,132 | B2 * | 7/2011 | Bean et al. .................... | 712/234 |

* cited by examiner

*Primary Examiner* — Eric Coleman
(74) *Attorney, Agent, or Firm* — Blakely, Sokoloff, Taylor & Zafman LLP

(57) ABSTRACT

Methods and apparatus for enhanced microcode address stack pointer manipulation are described. In some examples, the stacks are invisible to software. A microcode instruction pointer (UIP) and a next address to be accessed in a microcode storage unit may be generated based on an opcode of a microoperation, a marker, and a UIP stack address. The UIP stack address may be generated based on a signal and an immediate field of the microoperation.

20 Claims, 6 Drawing Sheets

```
flow_A:
ITMP2 = add (ITMP3, RAX);
ITMP1 = xor (ITMP2, BIT_MASK_ALPHA);
ITMP7 = load (ITMP2, RSI);
ITMP0 = add (ITMP7, ITMP0)
          push_nuip0_write_umar(0x7120)
          jump_target(subrountine_foo);
flow_A_cont:
<rest of flow>
```

```
flow_B:
ITMP2 = add (ITMP1, RCX);
ITMP1 = xor (ITMP9, BIT_MASK_BETA);
ITMP0 = load (ITMP9, RDI);
ITMP5 = add (ITMP2, ITMP5)
          push_nuip0_write_umar(0x2095)
          jump_target(subrountine_foo);
flow_B_cont:
<rest of flow>
```

```
subroutine_foo:
@umar_1 = add (@umar_0, 0x5);
@umar_3 = shift_left (@umar_1, 0x16);
@umar_3 = subtract (@umar_3, @umar_2)
          return_from_subroutine;
```

*FIG. 3*

ENHANCED MICROCODE ADDRESS STACK POINTER MANIPULATION

FIELD

The present disclosure generally relates to the field of electronics. More particularly, an embodiment of the invention relates to techniques for enhanced microcode address stack pointer manipulation.

BACKGROUND

Some processors may utilize complex flows based on read-only memory code (also known as "microcode") to implement an instruction set architecture (ISA). In some implementations, the microcode may be arranged or logically divided into microcode subroutines. However, efficiency of calls to microcode subroutines may be hindered due to the overhead associated with calling or returning from the microcode subroutines.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 3 illustrates sample psuedo codes according to some embodiments.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" and "micro-operation" (uop) is interchangeable as discussed herein.

Some of the embodiments discussed herein may be utilized to provide enhanced microcode address stack pointer manipulation. Some processors may utilize complex flows based on read-only memory (ROM) code (also known as "microcode") to implement an instruction set architecture (ISA). In some implementations, the microcode may be arranged or logically divided into microcode subroutines. However, efficiency of calls to microcode subroutines may be hindered due to the overhead associated with calling or returning from the microcode subroutines.

In an embodiment, overhead associated with calling and/or returning from a microcode subroutine may be reduced. For example, one or more micro address stack(s) may be provided through the use of a field or marker on any shared operation being read from the microcode storage (e.g., ROM). In some embodiments, these micro address stack(s) are visible to software (i.e., are software-invisible stacks) and/or are capable of passing parameters without using software stack(s). This in turn allows utilization of even very short ROM based subroutines due to the low overhead of jumping to and returning from the routines. In one embodiment, a logic allows for implicit (e.g., via a field used as a special marker that indicates one or more special properties for micro-operations (also referred to herein as "micro op" or "uop")) and/or explicit (via uop encoding) write operation(s) to one or more micro address stacks. Moreover, the logic for implicit and/or explicit usage of one of the micro address stacks may be used as a return target from a microcode subroutine. In an embodiment, the field or special marker used for implicit operations may indicate a special property, e.g., indicating beginning or end of microcode flow. For example, marking the end of flow of a uop may allow for pending traps to take effect at the uop boundary. Also, the special property may cause forcing of serialization.

Figure 1:
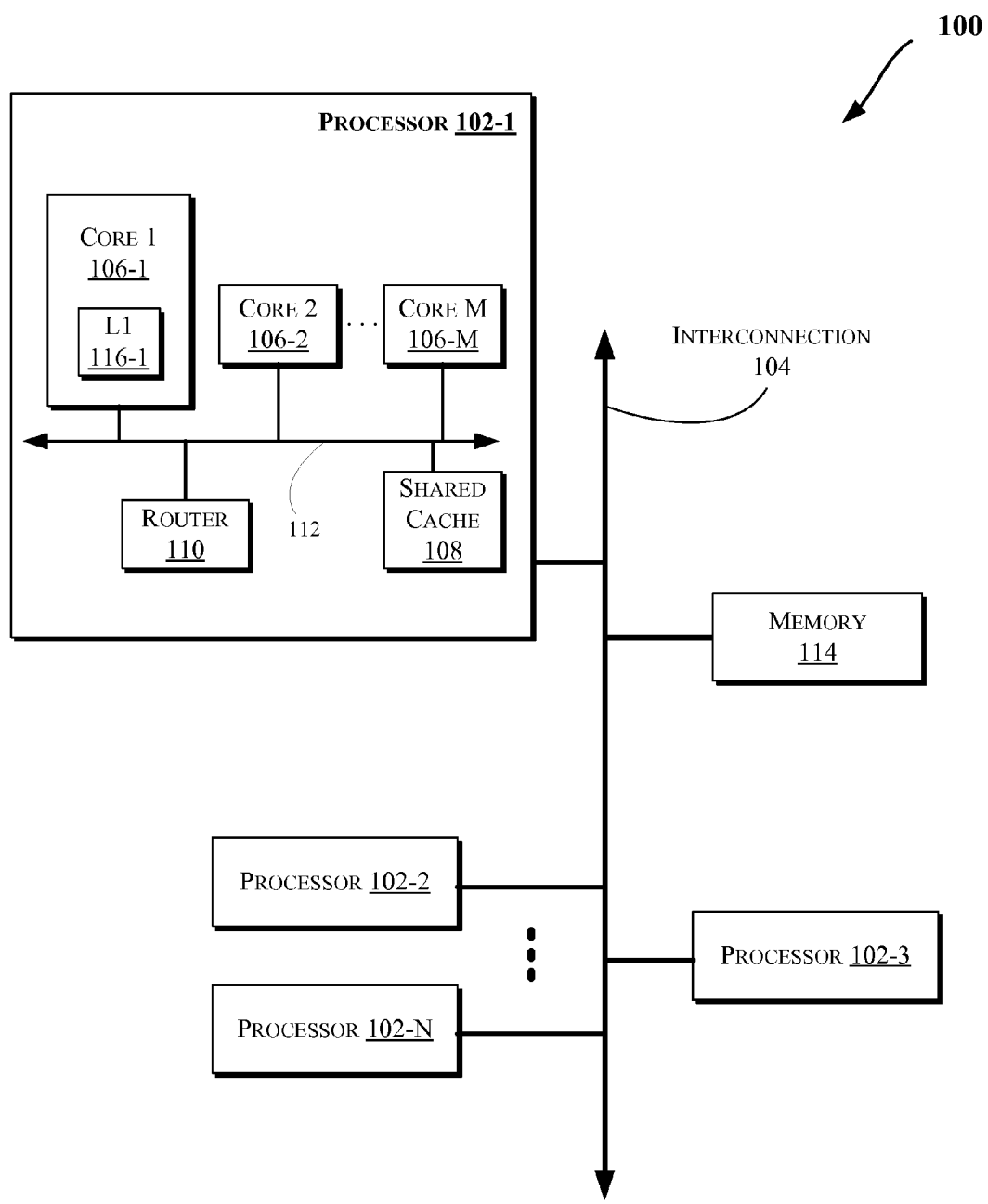
FIGS. 1, 5, and 6 illustrate block diagrams of embodiments of computing systems, which may be utilized to implement various embodiments discussed herein.

The techniques discussed herein may be used in a prediction component of a processor, such as the processors discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116").

Figure 2:
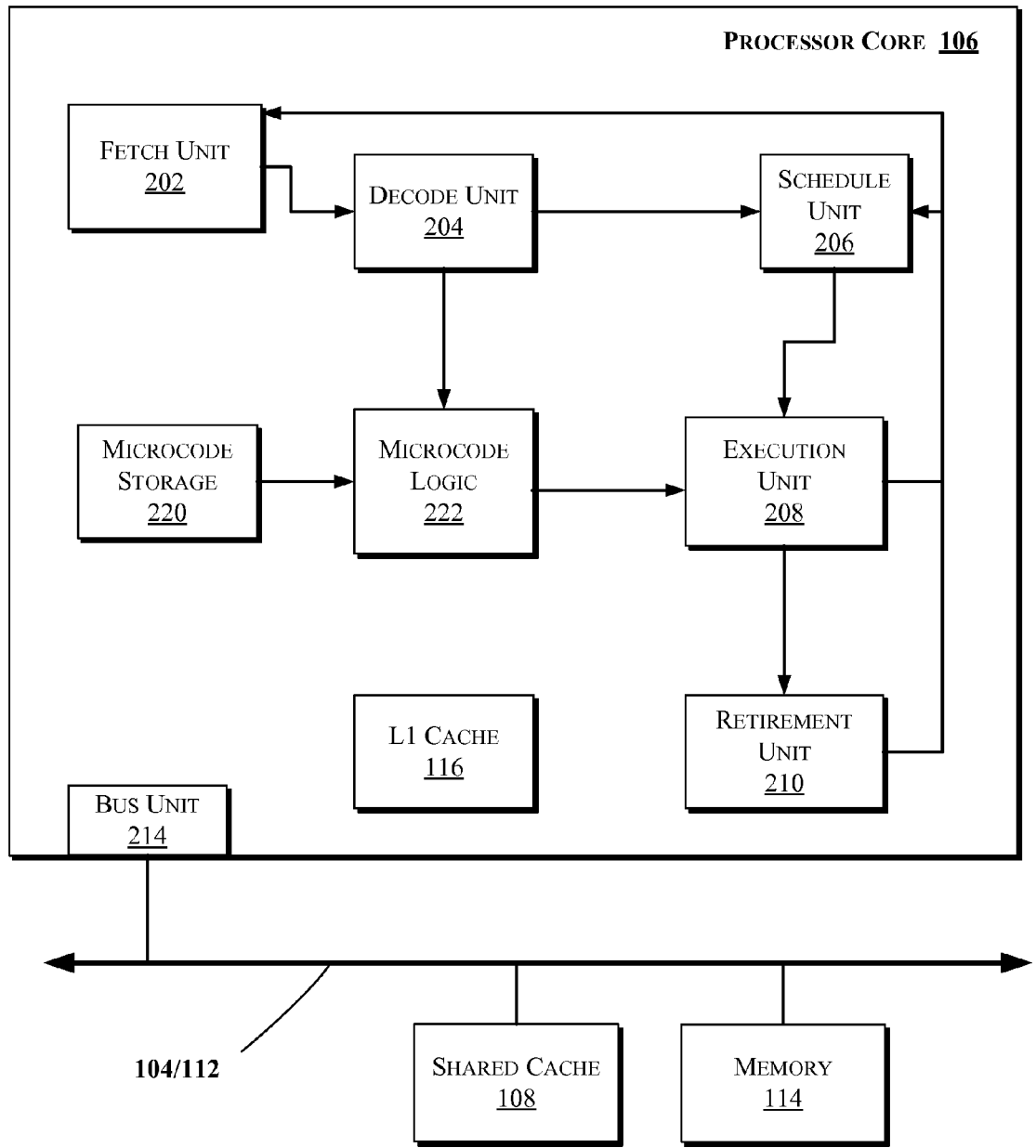
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions (including instructions with conditional or indirect (e.g., unconditional) branches) for execution by the core 106. The instructions may be fetched from any storage devices such as the memory 114 and/or the memory devices discussed with reference to FIGS. 4 and 5. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as branch targets for indirect branches).

As illustrated in FIG. 2, the core 106 may include a microcode storage unit 220. In an embodiment, the storage unit 220 may be ROM. A microcode logic 222 may have access to the microcode storage unit 220. In an embodiment, overhead associated with calling and/or returning from a microcode subroutine may be reduced. For example, one or more micro address stack(s) may be implemented by the microcode logic 222 through the use of a field or marker included on a shared operation being read from the microcode storage unit 220. In one embodiment, the logic 222 allows for implicit (e.g., via a field used as a special marker that indicates one or more special properties for micro-operations (also referred to herein as "micro op" or "uop")) and/or explicit (via uop encoding) write operation(s) to one or more micro address stacks.

Figure 4:
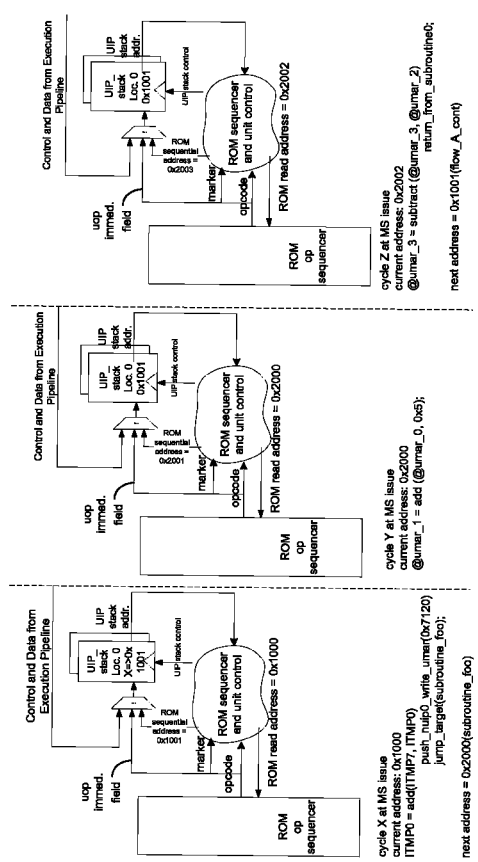
FIG. 4 illustrates a block diagram of logic in accordance with an embodiment.

Referring to FIGS. 3-4, flow diagrams associated with shared subroutine(s) are illustrated, in accordance with some embodiments. For example, a ROM-based program flow may call a shared subroutine "foo". As shown in FIG. 3, flow_A and flow_B may each make a call to subroutine_foo and use a special marker (such as discussed herein) to push the sequential microcode instruction pointer (UIP) onto a return UIP stack. This example has a two location stack and the encodings are controlling location 0; however, the embodiments are not limited to these specifics. In addition, the special markers may trigger a write operation of an immediate field of a microoperation into a microcode alias register (UMAR). At the end of the subroutine, a special marker may be used to trigger the consumption of the return UIP stack location 0 value.

In an embodiment, the UMAR has 16-bits which may be logically divided into up to four groups of four contiguous bits. Each of the four, 4-bit groups may be used to store a value representing a location of a parameter. In one example, bits 3:0 may be used to store UMAR0, bits 7:4 may be used to store UMAR1, bits 11:8 may be used to store UMAR2, bits 15:12 may be used to store UMAR3. In one or more embodiments, the values stored in the UMAR may refer to locations in the integer, floating point, or segment register file depending on the context of the operation being performed. This is just one example embodiment of an UMAR, and the scope of the embodiments of the invention is not limited to this particular example UMAR. In alternate embodiments, either fewer or more locations, each having either fewer or more bits for each location, including not necessarily the same number of bits for each location, are also suitable.

Referring to FIG. 4, portions of the microcode logic 222 of FIG. 2 are shown for three cycles. At a cycle X (e.g., at MS issue), subroutine_foo is called. As shown, a ROM opcode sequencer logic may send the opcode to a ROM sequencer and unit control logic, e.g., based on a ROM read address. As discussed herein, "MS" refers to Microcode Sequencer. In one embodiment, MS refers to the block of logic that includes the control, the ROM arrays, the RAM structures for applying "patches" to the ROM, etc. In an embodiment, the ROM sequencer and unit control logic may be coupled to the microcode storage unit 220 of FIG. 2 to access microcode instructions. The ROM sequencer and unit control logic may also receive the special marker and utilize the opcode and marker to generate the next address for the ROM. A multiplexer selects between control and data from the execution pipeline (e.g., execution unit 208), uop immediate field, and ROM next address. The output of the multiplexer is then fed to UIP stack to generate a UIP stack address. The UIP stack address is then provided to the ROM sequencer and unit control logic, e.g., to generate UIP stack control. At cycle Y, the next address is processed. At cycle Z, a return from subroutine occurs. Furthermore, the timing of accesses to the microcode logic discussed herein may change (e.g., every cycle, every two cycles, with one or more bubbles in-between, etc.) and no specific timing relationship is required for one or more embodiments of the invention.

In some embodiments, two independent stacks may be maintained. The values that may be pushed onto the address stacks may be a sequential address of a uop or come from the immediate field of the uop. The immediate field may be used on uops which otherwise do not use the immediate field. Pushing a value onto the stack may be controlled either from a special marker or from an explicit uop encoding. Explicit uops are sometimes necessary when there is no special marker available. With multiple stacks and controls to push onto each stack independently, it is possible for a single uop in the ROM to push its sequential address onto one stack via a special marker while pushing its immediate value onto another stack via an explicit "push" uop encoding.

To return from a subroutine to the address contained on one of the microcode address stacks, a special maker or an explicit "fast_return" uop encoding may be employed. Additionally, address stack manipulation may be combined with the micro alias register feature such that a single marker or uop encoding may push the sequential address of the uop onto the address stack and take the immediate field of the uop to write parameter mapping information into the microcode alias register (UMAR).

Generally, microcode is one primary vehicle used for the creation and maintenance of ISA features. Microcode may also include a large amount of processor core silicon area, leakage power, design effort, and validation effort. To this end, some embodiments improves these vectors by enabling flexible microcode subroutine creation and reuse, while not impacting microcode performance or size.

The combination of both implicit, explicit, and UMAR combined forms of stack manipulation enable a very flexible yet light weight implementation. This minimal overhead enables even short sequences of 3-5 uops to be coded as a subroutine while causing minimal to no degradation in flow performance. Marker decode hardware (such as discussed with reference to FIG. 4), parallel processing of both special marker and uop information in the same cycle, and prioritization hardware for handling simultaneous special maker and uop based control result in more efficient use of microcode subroutines. Also, if such techniques are not used, performance may be degraded and/or additional microcode instructions may have to be used to manipulate the stack.

Figure 5:
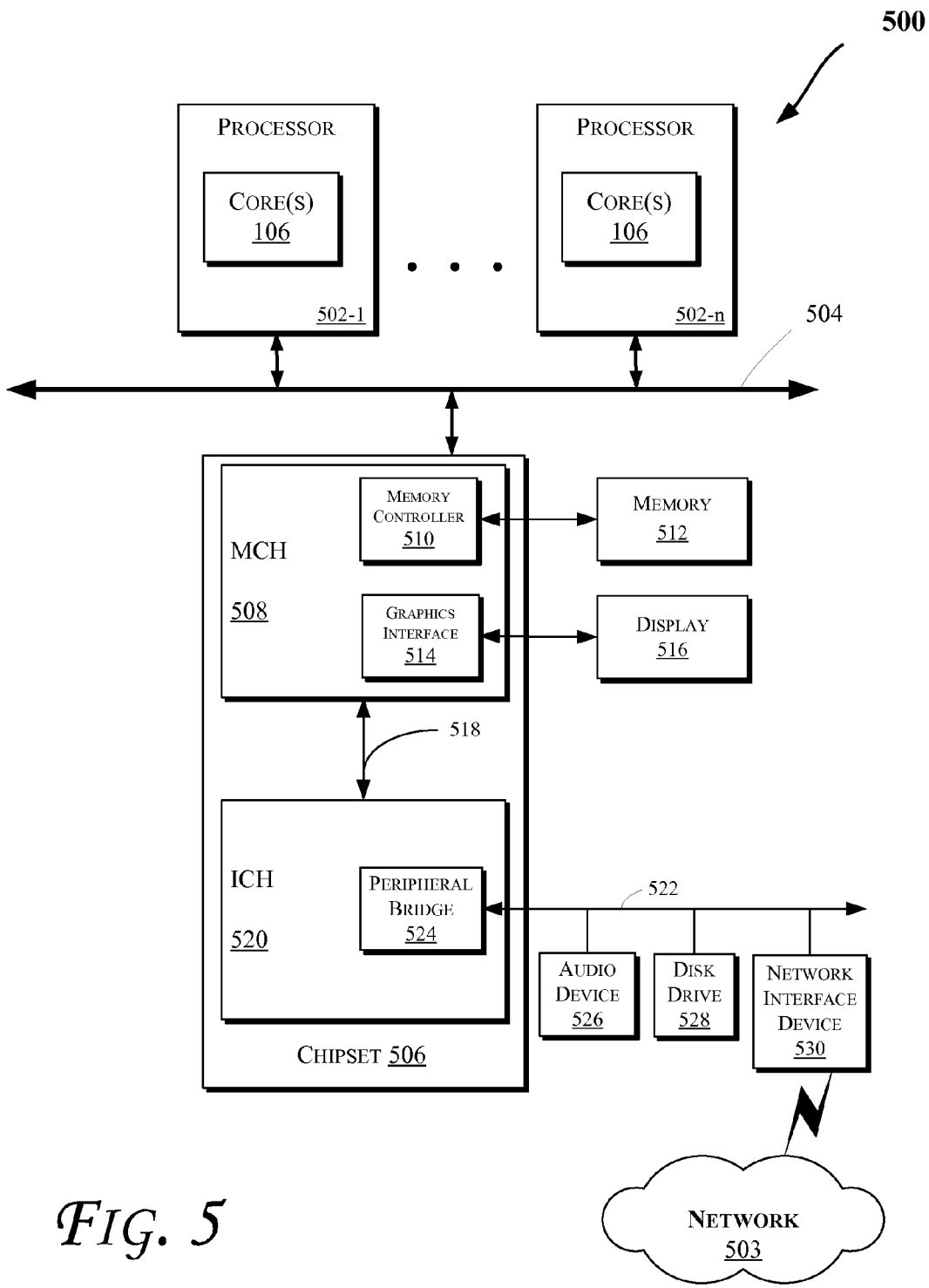

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the cores 106 discusses with reference to FIGS. 1 and/or 2. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
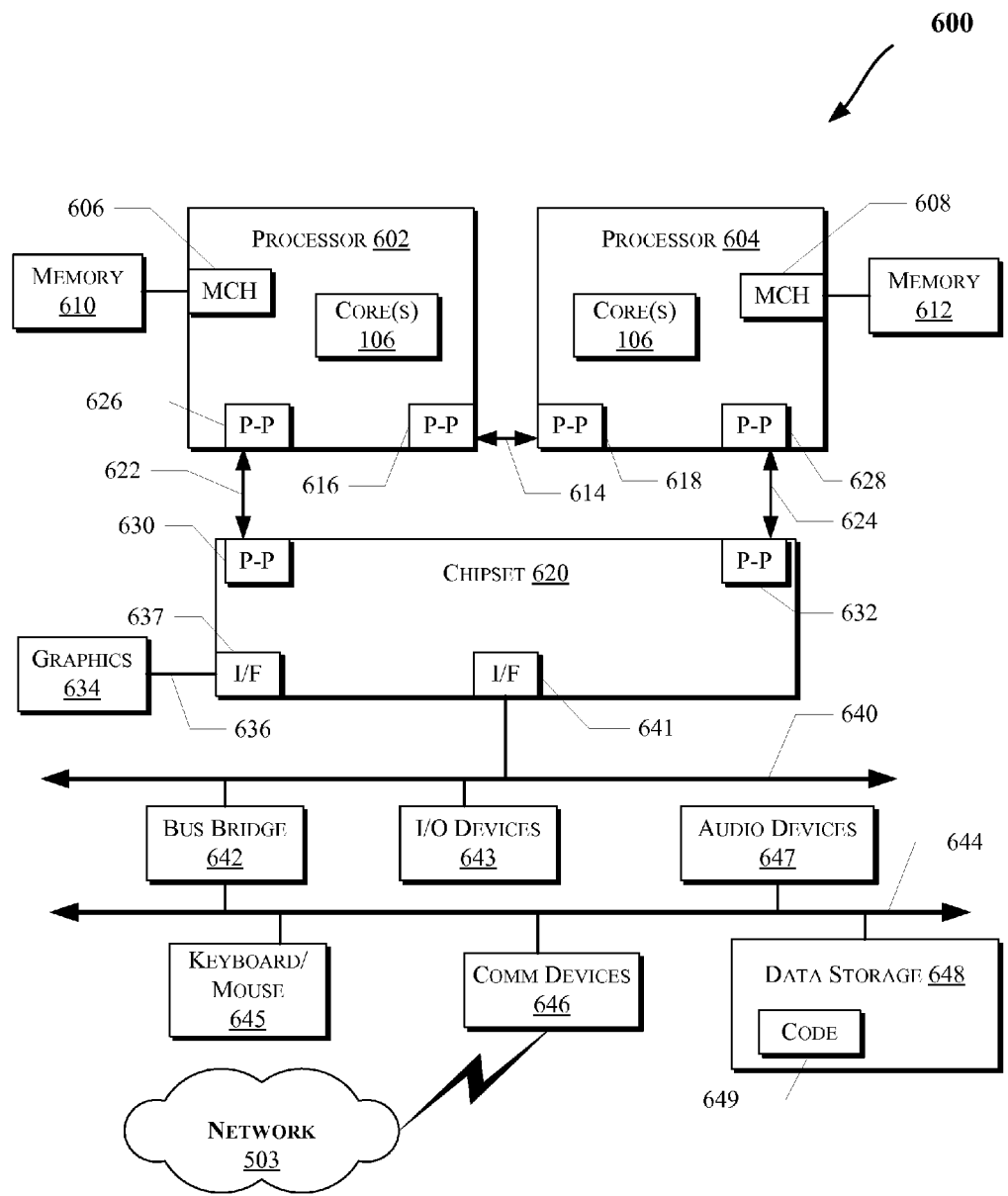

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIGS. 1-2 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   a read only memory sequencer and unit control unit to generate a microcode instruction pointer (UIP) and a next address to be accessed in a microcode storage unit based on an opcode of a microoperation, a marker, and a UIP stack address; and
   a UIP stack to generate the UIP stack address based on a signal from the read only memory sequencer and unit control unit and an immediate field of the microoperation.

2. The processor of claim 1, wherein the immediate field of the microoperation is to be written to a microcode alias register (UMAR) in response to the marker.

3. The processor of claim 1, further comprising a software-invisible stack, wherein a value is to be pushed onto the stack in response to the marker or an explicit uop encoding.

4. The processor of claim 1, further comprising a plurality of software-invisible stacks, wherein a value is to be pushed onto a first stack of the plurality of stacks in response to the marker and another value is to be pushed onto a second stack of the plurality of stacks in response to an explicit uop encoding.

5. The processor of claim 1, further comprising logic, coupled to the microcode storage unit, to generate one or more of the opcode of the microoperation, the marker, and the immediate field of the microoperation.

6. The processor of claim 1, further comprising a plurality of processor cores, wherein at least one of the plurality of processor cores is to comprise one or more of the read only memory sequencer and unit control unit, the UIP stack, or the microcode storage unit.

7. The processor of claim 1, wherein the UIP stack is to comprise a multiplexer to select amongst control and data from an execution unit, or the microoperation immediate field.

8. The processor of claim 7, wherein the UIP stack is to comprise a storage unit, coupled to the multiplexer, wherein the storage unit is to store data corresponding to the UIP stack address.

9. The processor of claim 1, wherein the read only memory sequencer and unit control unit, the UIP stack, the microcode storage unit, and a processor core are on a same integrated circuit die.

10. A method comprising:
    generating a microcode instruction pointer (UIP) and a next address to be accessed in a microcode storage unit based on an opcode of a microoperation, a marker, and a UIP stack address; and
    generating the UIP stack address based on a signal and an immediate field of the microoperation.

11. The method of claim 10, further comprising writing the immediate field of the microoperation to a microcode alias register (UMAR) in response to the marker.

12. The method of claim 10, further comprising pushing a value onto a software-invisible stack in response to the marker or an explicit uop encoding.

13. The method of claim 10, further comprising pushing a value onto a first stack of a plurality of stacks in response to the marker and pushing another value onto a second stack of the plurality of stacks in response to an explicit uop encoding.

14. The method of claim 10, further comprising generating one or more of the opcode of the microoperation, the marker, and the immediate field of the microoperation.

15. The method of claim 10, further comprising selecting amongst control and data from an execution unit, or the microoperation immediate field.

16. A system comprising:
  a memory to store one or more instructions; and
  a processor, coupled to the memory, to execute the one or more instructions, the processor to comprise:
    a first logic to generate a microcode instruction pointer (UIP) and a next address to be accessed in a microcode storage unit based on an opcode of a microoperation, a marker, and a UIP stack address; and
    a second logic to generate the UIP stack address based on a signal from the first logic and an immediate field of the microoperation.

17. The system of claim 16, wherein the immediate filed of the microoperation is to be written to a microcode alias register (UMAR) in response to the marker.

18. The system of claim 16, further comprising a software-invisible stack, wherein a value is to be pushed onto the stack in response to the marker or an explicit uop encoding.

19. The system of claim 16, further comprising a third logic to generate one or more of the opcode of the microoperation, the marker, and the immediate field of the microoperation.

20. The system of claim 16, further comprising an audio device coupled to the processor.

* * * * *